United States Patent Office 3,681,101
Patented Aug. 1, 1972

3,681,101
METHOD OF PREPARING PIGMENT
COMPOSITION
Thomas S. Griffin, Webster Groves, Warren Rodgers, St. Louis, and Charles R. Trampier, Jr., Webster Groves, Mo., assignors to N. L. Industries, Inc., New York, N.Y.
No Drawing. Filed Oct. 9, 1970, Ser. No. 79,708
Int. Cl. C09c 1/00, 1/02, 1/36
U.S. Cl. 106—299
2 Claims

ABSTRACT OF THE DISCLOSURE

This invention relates to a new composition of matter which is useful as a pigment composition for the paper industry. The composition comprises an intimate mixture of $TiO_2$, $Al_2O_3 \cdot SiO_2 \cdot H_2O$ and $CaSO_4$.

BACKGROUND OF THE INVENTION

Many types of pigment materials have been used in the paper industry for opacifying the paper. Among those most commonly used are opacifiers such as $TiO_2$ and zinc oxide pigments and extenders such as clays, silicates, carbonates and the like. The instant invention is concerned with the use of titanium dioxide pigment used in conjunction with silicate extenders such as calcium silicate and aluminum silicate.

In preparing paper, the paper pulp is admixed with the opacifiers and extenders and to the mixture is added resins for sizing and alum for flocculating the size. Although calcium silicate has been used in the past as the extender in conjunction with $TiO_2$ pigment, it has been found that some of the calcium silicate reacts with the alum present thus reducing the amount of alum available for flocculation.

It would therefore be desirable to produce a new composition of matter which contains the opacifying agent and an extender which does not adversely effect the chemical reagents used in the paper making process while at the same time produce a paper which has high opacity, particularly dry hiding power.

SUMMARY OF THE INVENTION

A new composition of matter has been produced which comprises an intimate and homogeneous mixture of the following constituents:

| | Percent |
|---|---|
| $Al_2O_3 \cdot xSiO_2 \cdot yH_2O$ | 10–60 |
| $CaSO_4$ | 0–20 |
| $TiO_2$ | 40–85 | where $x$ in said $Al_2O_3 \cdot xSiO_2$ is 3–12 moles $SiO_2$ for each mole of $Al_2O_3$ and where $y$ is 10–20% of said $Al_2O_3 \cdot xSiO_2$, all percentages in said composition expressed on a weight basis.

The composition of matter is prepared as follows:

(1) Reacting an aqueous slurry of calcium sulfate with a sodium silicate solution to form an aqueous slurry of calcium silicate containing soluble sodium sulfate, the amount of silica in said sodium silicate being from 0.7 to 4.0 moles of silica for each mole of $Na_2O$ and the amount of sodium silicate added being from 1.1 to 2.0 moles for each mole of calcium sulfate present;

(2) Adding aluminum sulfate to said reaction products to form a slurry of aluminum silicate and calcium sulfate having a pH of 4.0 to 6.0, the amount of aluminum sulfate added being sufficient to react with all of the calcium silicate formed in step (1) and in addition the amount of aluminum sulfate to react with all of the remaining sodium silicate which was unreacted in step (1);

(3) Washing the reacted products with water to remove the sodium sulfate therefrom;

(4) Adding a titanium dioxide pigment to said mixture; and thereafter drying and milling said products.

The amount of aluminum sulfate needed to react with the calcium silicate and the sodium silicate present in the reaction mixture is ⅓ mole of aluminum sulfate for each mole of calcium silicate plus ⅓ mole of aluminum sulfate for each mole of sodium silicate.

Example 1

In this example 1000 parts of a gypsum slurry containing 4.4% $CaSO_4$ were prepared. To this slurry was added a sodium silicate solution diluted to 92 g.p.l. $SiO_2$. The amount of sodium silicate added was 256 parts of N-Brand sodium silicate ($Na_2O \cdot 3.33 \cdot SiO_2$) which is a 9% excess of sodium silicate over the theoretical amount to form the following reaction:

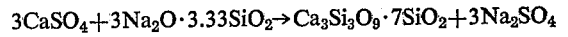

$$3CaSO_4 + 3Na_2O \cdot 3.33SiO_2 \rightarrow Ca_3Si_3O_9 \cdot 7SiO_2 + 3Na_2SO_4$$

With rapid agitation the sodium silicate solution was added to the gypsum slurry over a period of 25 minutes. After all of the sodium silicate solution was added, the mixture was agitated for an additional 30 minutes.

An aluminum sulfate solution containing 0.05 g. $Al_2O_3$/ml. was added with agitation to the calcium silicate sodium sulfate mixture at the rate of 10 ml./minute until a pH of 5.0 was reached. A total of 11.2 grams of aluminum sulfate calculated as $Al_2O_3$ were added. After the aluminum sulfate has been added the agitation was continued for 60 minutes.

The slurry was then deliquored and washed with 6 liters of demineralized water heated to 60° C. which was equivalent to 3 volumes of water for each volume of slurry. After washing, 714 g. of wet filter cake containing 21% solids were mixed with 350 g. titanium dioxide pigment slurries in 1 liter of water. The mixture was agitated for 20 minutes. The slurry mixture was then deliquored and dried at 110° C. overnight. The dried composition was then thoroughly milled.

The milled product had the following properties:

| | |
|---|---|
| $TiO_2$ | 66.6 |
| Volatile matter | 6.4 |
| pH | 4.9 |
| Oil absorption | 48.0 |
| Opacity in paper hand sheets, percent contrast ratio | 86 |

The oil absorption was determined by the standard ASTM-D281-31 test.

The opacity was determined in a 5% pigment handsheet described in TAPPI-I-425 test in which the pigment in the hand-sheet consisted of varying amounts of $TiO_2$ and the extender composition of the instant invention. The opacity is recorded as percent contrast ratio.

In this particular example the milled product contained 66.6% $TiO_2$ and when tested in the 5% pigment handsheet, the contrast ratio was 86%.

The opacity was also determined in a 5% pigment handsheet in which the amount of $TiO_2$ was 50% instead of 66.6% and the opacity measured as percent contrast ratio was 85%. This is recorded in the table as Example 1a.

For comparison, the opacity was measured in a 5% pigment hand-sheet in which the pigment was 100% titanium dioxide (no extender) and the percent contrast ratio was only 85%.

It has also been discovered that the titanium dioxide pigment may be added at any stage in the process after the calcium silicate has been formed but before the final milling step.

Examples 2–4

In these examples the procedure of Example 1 was repeated except that various amounts of sodium silicate and aluminum sulfate were employed. The titanium dioxide pigment was also added at various stages.

In all cases the results were substantially the same as that described in Example 1.

The operational details and results obtained are recorded in the following table along with those of Example 1.

TABLE

| Example number | 1 | 1a | 2 | 3 | 4 | Control |
|---|---|---|---|---|---|---|
| Percent of sodium silicate added over the theoretical amount to form the calcium silicate Composition | 9 | 9 | 100 | 9 | 25 | |
| Stage at which $TiO_2$ is added to the silicate | (1) | (1) | (1) | (2) | (1) | |
| Opacity in paper hand sheets, percent contrast ratio | 86 | 85 | 85 | 85 | 85 | 85 |
| Percent $TiO_2$ | 66.6 | 50.0 | 66.8 | 61.0 | 66.6 | 100 |

¹ After washing.
² After calcium silicate formation.

It has clearly been shown that the new composition of matter which contains only 40 to 85% $TiO_2$ possesses opacities in paper hand-sheets (at 5% pigment level) equal to or better than hand-sheets containing 100% $TiO_2$ as the pigment employed.

While this invention has been described and illustrated by the examples shown, it is not intended to be strictly limited thereto, and other variations and modifications may be employed within the scope of the following claims.

We claim:

1. A method for preparing an intimate and homogeneous composition of matter which comprises:
   (1) reacting an aqueous slurry of calcium sulfate with a sodium silicate solution to form an aqueous slurry of calcium silicate containing soluble sodium sulfate, the amount of silica in said sodium silicate being from 0.7 to 4.0 moles of silica for each mole of $Na_2O$ and the amount of sodium silicate added being from 1.1 to 2.0 moles for each mole of calcium sulfate present;
   (2) adding aluminum sulfate to said reaction products to form a slurry of aluminum silicate and calcium sulfate having a pH of 4.0 to 5.5, the amount of aluminum sulfate added being sufficient to react with all of the calcium silicate formed in step (1) and in addition the amount of aluminum sulfate to react with all of the remaining sodium silicate which was unreacted in step (1);
   (3) washing the reacted products with water to remove the sodium sulfate therefrom;
   (4) adding a titanium dioxide pigment to said mixture, the amount of titanium dioxide pigment being sufficient to form a composition containing from 40–85% $TiO_2$, the remainder being compounds of aluminum silicate and calcium sulfate; and thereafter drying and milling said products.

2. Process according to claim 1 in which the amount of aluminum sulfate needed to react with the calcium silicate and the sodium silicate present in the reaction mixture is ⅓ mole of aluminum sulfate for each mole of calcium silicate plus ⅓ mole of aluminum sulfate for each mole of sodium silicate.

References Cited

UNITED STATES PATENTS

| 2,786,758 | 3/1957 | Taylor | 106—306 X |
| 2,786,776 | 3/1957 | Allen | 106—306 X |
| 2,786,777 | 3/1957 | Allen | 106—306 |
| 2,943,971 | 7/1960 | Taylor | 106—306 X |
| 3,528,836 | 9/1970 | Craig | 106—300 |
| 3,567,480 | 3/1971 | Craig. | |

TOBIAS E. LEVOW, Primary Examiner

H. M. S. SNEED, Assistant Examiner

U.S. Cl. X.R.

106—300, 306